R. A. SWANSON

COVER RETAINING MEANS

April 5, 1932.

Re. 18,407

Original Filed Jan. 11, 1929

Inventor

R. A. Swanson

By Clarence A. O'Brien

Attorney

Reissued Apr. 5, 1932

Re. 18,407

UNITED STATES PATENT OFFICE

REYNOLD A. SWANSON, OF MONTROSE, SOUTH DAKOTA

COVER RETAINING MEANS

Original No. 1,752,710, dated April 1, 1930, Serial No. 331,940, filed January 11, 1929. Application for reissue filed May 1, 1931. Serial No. 534,403.

This invention relates to improved novel cover retaining means which is especially but not necessarily adapted for use in association with a removable lid such as is employed upon standard thirty dozen egg cases.

Various types of fastening devices and means are ordinarily employed for securing the cover in place.

Much difficulty is experienced in removing the cover without disrupting it, and without materially injuring the body of the case.

My object is to provide a simple and inexpensive means in the form of attachments which are applicable to the end of the cover and which are designed to be conveniently connected with and disconnected from the end cleats on the ends of the case.

The particular structural features and advantages characterizing the improvement will become more readily apparent from the following description and drawings.

Figure 1:
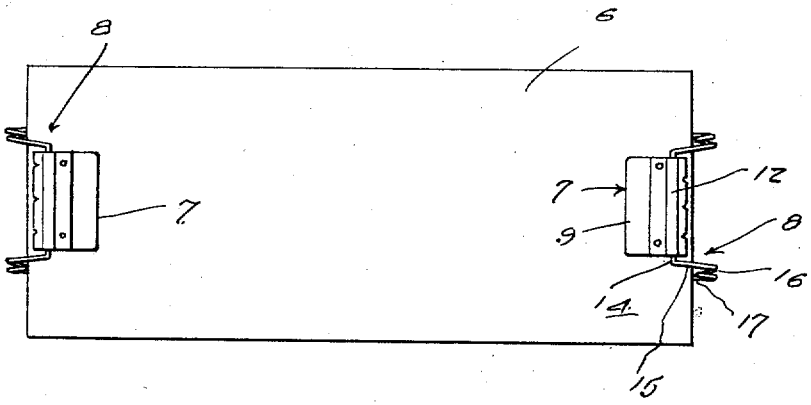
Fig. 1 is a top plan view of a cover provided with retaining devices constructed in accordance with the present invention.
Figure 2:
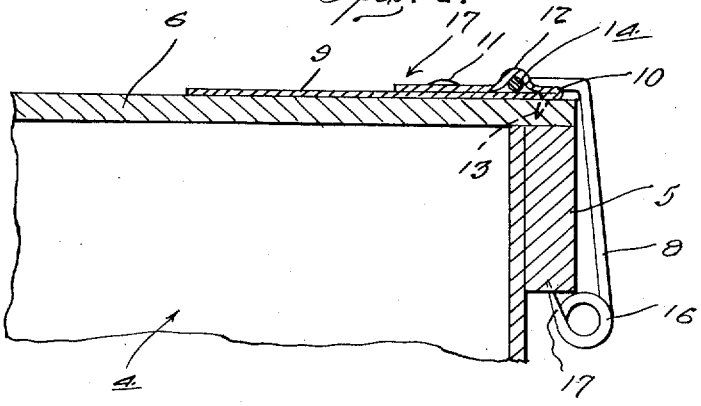
Fig. 2 is an enlarged fragmentary sectional and elevational view showing the particular method in which the invention co-acts with a complemental cleat.
Figure 3:
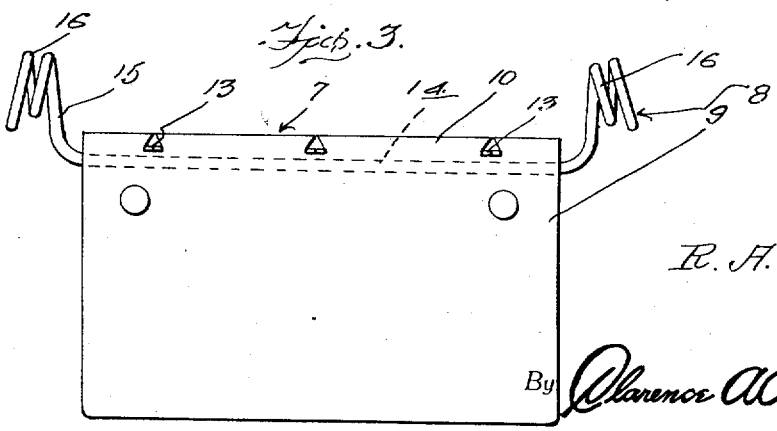
Fig. 3 is a bottom plan view of the complete attachment removed from the cover.

In the drawings, the reference character 4 designates the body of an ordinary egg crate which is provided at each end with a shoulder forming cleat 5. The cover, which is of ordinary construction, is designated by the reference character 6. The improved retaining device is in the form of an attachment, and each device comprises an attaching plate 7 and a swingably mounted retainer 8 associated with the plate. In practice, I propose to provide a pair of such attachments but since each attachment is the same in construction, a description of one will suffice for both. The attaching plate 7 comprises a body portion 9 having one end portion bent upon itself as at 10 and then bent over into overlapping relation with the body portion where it is riveted or otherwise fastened in place, as at 11. The portion between the bend 10 and the rivet fastening is formed into a hinge bearing as at 12. Moreover, the bent portion 10 has anchoring prongs 13, struck out therefrom and adapted to be embedded in the wood of the cover, as indicated in dotted lines in Figure 2.

The part 8 is constructed from a single length of wire bent into substantially U-shaped form. The bight or central portion 14 constitutes a hinge pintle and is mounted for pivotal movement in the bearings 12. The arm portions 15 are formed into coils 16 and terminate in pointed fastening hooks 17. The gist of this part 8 of the invention is to provide a resilient swingably mounted clamp which may be readily engaged with or disengaged from the cleat 5.

With this arrangement, it is obvious that I have developed a cover fastening device constructed of two parts, an attaching portion and a retaining portion, the retaining portion being so connected with the attaching portion that it may be readily swung toward and from the cleat, in order to effect the firm fastening of the cover. This structure is believed to be a mechanical achievement in the art. It is distinguishable and different in construction, economical, practical in design and arrangement, positive and dependable in action, and capable of fulfilling the requirements of an invention of this class in a more satisfactory manner in that it obviates the necessity of employing special nail remover and tool in taking the cover off. It is thought that by carefully considering the description in connection with the drawings, a clear understanding of the construction and operation will be obtained. Therefore, a more lengthy description is regarded as unnecessary.

Minor changes in the shape, size and rearrangement of details coming within the field of invention claimed may be resorted to, in actual practice, if desired.

What is claimed is:—

1. As a new product of manufacture, a cover fastener of the class described comprising an attaching plate and a substantially U-shaped clamping member swingably mounted on one end portion of said plate, the arms of said member terminating in coils, and resilient retaining hooks.

2. As a new product of manufacture, a cover fastener of the class described comprising an attaching plate provided with a bearing and anchoring prongs, a substantially U-shaped wire clamping device, the bight portion of which is journaled for rotation in said bearing, the arm portion thereof being formed with coils and terminating in resilient retaining hooks adapted to be engaged with a complemental cleat.

3. As a new product of manufacture, a cover fastener for the cover of a crate, said crate having a cleat at its side some distance below the top, which fastener comprises means extending over and engaging the top surface of said cover adjacent its edge and spaced separate arms extending from said means and engaging the under surface of said cleat, said arms being formed of resilient wire bent to place tension on the same and said means, whereby said cover and crate are engaged at widely separated points and a firm holding effect is secured tending to prevent lifting of the edges of said cover or lateral shifting of said cover.

4. As a new product of manufacture, a device for holding the cover on a crate, which crate has a cleat secured thereto along one side, said device comprising means detachably engaging the top of said cover adjacent the edge thereof, an arm adjacent each side of said means adapted to extend down along the side of the crate and having its end bent to engage the under side of said cleat, said arms being made of resilient wire and comprising loops adapted to exert tension between said cover and cleat.

5. As a new product of manufacture, a cover fastener for the cover of a crate, said crate having a cleat secured thereto along its side, said fastener comprising means extending over and engaging the top surface of said cover adjacent its edge and spaced separate means extending from said means adapted to extend down and engage the under surface of said cleat at points outward of said first mentioned means, said fastener comprising resilient wire bent to place tension on both of said means, whereby said cleat is engaged at widely separated points and a firm holding effect is obtained on said cover.

In testimony whereof I affix my signature.

REYNOLD A. SWANSON.